March 31, 1931.  W. C. BETZ  1,798,864
SPRING SHACKLE
Original Filed Oct. 28, 1924   2 Sheets-Sheet 1
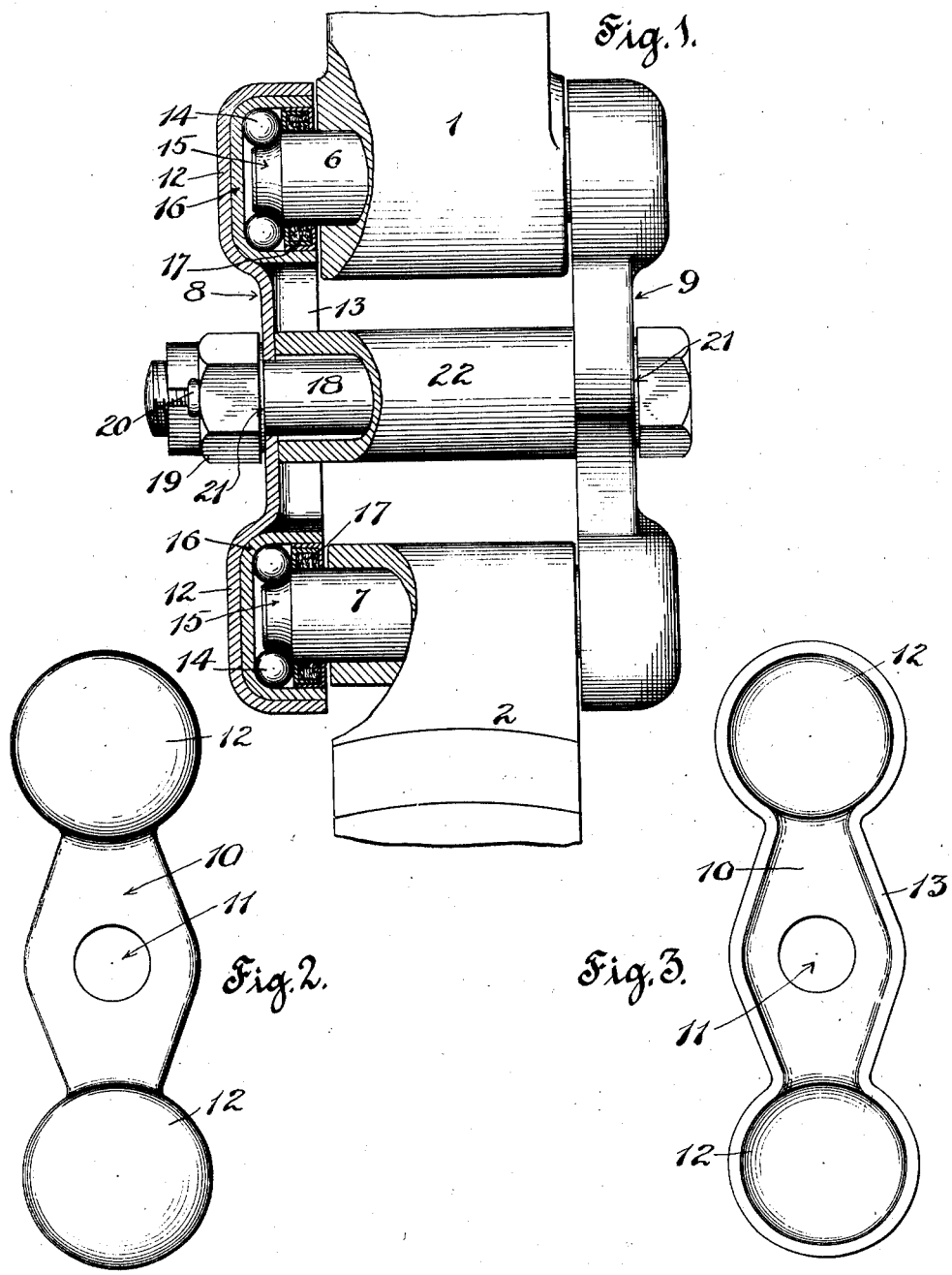

March 31, 1931.  W. C. BETZ  1,798,864
SPRING SHACKLE
Original Filed Oct. 28, 1924   2 Sheets-Sheet 2
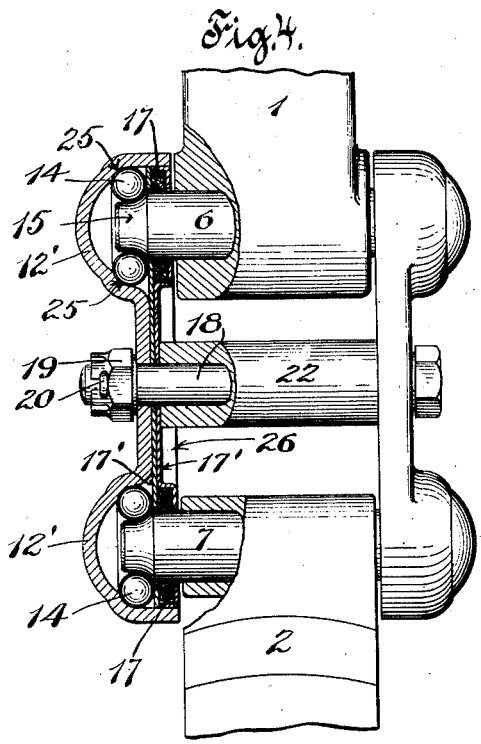
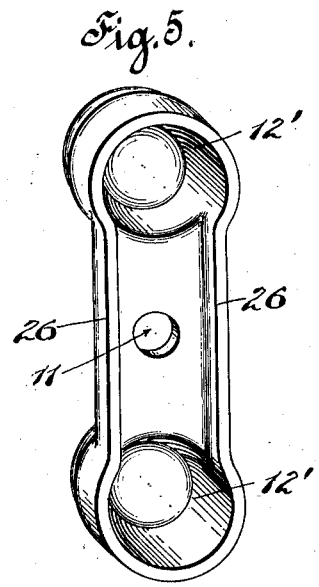
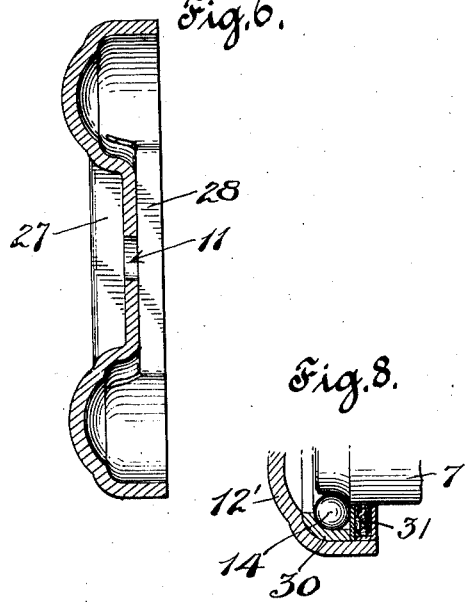
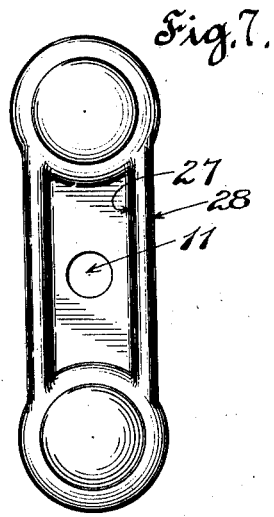
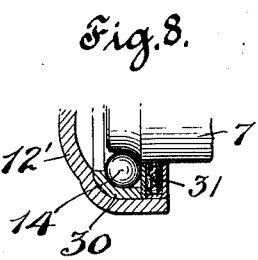

Patented Mar. 31, 1931

1,798,864

UNITED STATES PATENT OFFICE

WILLIAM C. BETZ, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Application filed October 23, 1924, Serial No. 746,328. Renewed August 19, 1930.

My invention relates to a spring shackle construction.

The present invention has to do more particularly with the construction of the shackle links and associated parts of an anti-friction bearing spring shackle.

It is the principal object of the invention to provide an anti-friction spring shackle in which the shackle links may be formed of relatively thin metal and which will be very light in weight, yet strong and serviceable in use.

It is a more specific object to provide a shackle link which may be formed of pressed metal so shaped as to receive anti-friction bearing members and have struck up strengthening means to resist bending.

A more general object is to provide a generally improved link for a spring connection which may be cheaply made and which will be strong and serviceable.

Other minor objects will appear as the specification proceeds.

In the drawings which show, for illustrative purposes only, preferred forms of the invention—

Fig. 1 is a view in end elevation of a spring shackle embodying features of my invention, parts being broken away to illustrate interior construction;

Fig. 2 is an outside view in elevation of one of the shackle links shown in Fig. 1;

Fig. 3 is an inside view of the shackle link shown in Fig. 2;

Fig. 4 is a view similar to Fig. 1 but showing a slightly modified form;

Fig. 5 is a perspective view of one of the links shown in Fig. 4;

Fig. 6 is a central longitudinal section through a modified form of link;

Fig. 7 is an outside view in elevation of the link shown in Fig. 6;

Fig. 8 is a fragmentary view illustrating another slight modification.

Referring to the form shown in Figs. 1 to 3, 1 designates a part of an automobile frame, while 2 indicates an automobile spring. Shackle pins or bolts 6—7 are rigidly secured in eyes or apertures in the frame and spring, respectively, and the ends of the pins project outwardly, beyond the edges of the frame and spring, as will be clear from an inspection of Fig. 1.

The spring and frame are connected to each other by means of shackle links 8—9, which are of somewhat peculiar form. Each link is preferably formed of sheet metal, which may be pressed into form for the sake of cheapness of manufacture and for structural reasons. In the specific form shown in Figs. 1 to 3, each link includes a central or middle portion 10, which may be relatively enlarged transversely near the center so as to give added strength to the link. An aperture 11 is formed in the large central portion of the link for a purpose to be later described.

By the same pressing operation there may also be formed at each end of the link a seat or socket 12 for receiving anti-friction bearing members, as will be later described. The metal is drawn up so as to provide a strengthening flange 13, preferably extending substantially completely around the cups 12 and along the intermediate connecting portion 10. This continuous flange imparts great strength to the shackle, so that in use it is prevented from being bent or distorted under the heavy loads and strains to which it is subjected. The finished pressed metal link may be said to be of channel shape, in that the flanges extend up from the main back portion 10 and from the end bearing cups.

Anti-friction bearing members which, in this case, are balls 14—14, are interposed between the end bearing cups on the shackle links and the bearing pins 6—7 held, respectively, in the frame and spring. In the form shown each shackle pin has a ball raceway or seat 15 formed directly on the surface thereof, and, as illustrated, the ball race is somewhat tapering, so as to permit the ready insertion of the end of the pin into the bearing cups and in contact with the balls. If desired, an anti-friction member bearing cup 16 of pressed metal may be set in the cups 12 formed in each shackle link. By this means direct wear on the link itself is prevented. Suitable dust-excluding and lubricant-retaining means, such as dust rings 17—17, may be fitted in the ends of the bearing cups 16—16, so as to exclude dust from the anti-friction bearing members and also to tend to retain lubricant therein.

When the shackle links are assembled on the bearing pins with the anti-friction members 14—14 interposed therebetween, the links may be held together, as by means of a single through bolt 18 passing through the aperture 11, as shown in Fig. 2, and through a corresponding aperture in the opposite link. A castle nut 19 may be screwed on the end of the through bolt 18 and be held in place by means of a cotter 20. Lock washers 21—21 may be used, if desired.

Whereas the balls will ordinarily tend to space the shackle links apart, it is in many cases desirable to positively space or position the shackle links relatively to each other, and for that purpose I may employ a bushing or spacer sleeve 22, interposed between the portions 10 of the shackle links, and this sleeve preferably surrounds the through bolt. As previously described, the central portion 10 of each shackle link is somewhat enlarged, so that, notwithstanding the aperture therethrough, a sufficient amount of metal is provided and the enlargement at the center forms what may be termed a truss-like structure for resisting bending of the link. The flange or flanges 13 likewise act as strengthening means to prevent bending of the shackle links in one direction.

In the modification shown in Figs. 4 and 5, the pins 6—7 held in the frame and spring 1 and 2, respectively, project beyond the edges thereof and are provided with anti-friction raceways or seats 15, as in the previous form. In this latter form, the ball bearing or anti-friction raceways 25—25 are formed directly in the cups 12'—12' at each end of the shackle link. The shackle links are held together, as by means of a through bolt 18, and the links may be spaced apart by the sleeve 22, as in the form previously described. Shackle links in the form shown in Figs. 4 and 5 are not bulged at the center, but the sides 26—26 forming flanges or sides of the generally channel-shaped pressed metal construction are substantially parallel to each other.

In Fig. 4 the felt dust rings 17—17 are preferably held between two sheet metal plates 17'—17' which extend substantially the length of the shackle links. In this case the spacer sleeve 22 preferably abuts against the dust ring plates and assists in holding the same in place.

The modified pressed metal link shown in Figs. 6 and 7 is generally similar to the form shown in Figs. 4 and 5 and may be used in practically the same way. In Figs. 6 and 7, however, the sides of the shackle link are first bent outwardly, as indicated at 27, and then inwardly to the free edge, as indicated at 28. This construction gives a double flanged effect, with a flange extending both upwardly and downwardly from the central plate portion 29 of the link.

As shown in Fig. 8, a separate pressed metal anti-friction bearing member seat 30 may be placed in each cup 12' instead of having the antifriction members run directly in the cups. A suitable dust ring or closure 31—which may be the same as the closure shown in Fig. 4—may be provided for positioning the raceway and for excluding dust and retaining lubricant. Certain features shown in Figs. 4 to 8 and covered broadly herein are specifically claimed in a divisional application, Serial No. 481,084, filed September 11, 1930.

The sheet or pressed metal constructions illustrated are cheap to manufacture in that there is little or no machining to do and the links are practically finished products when they come from the press.

The links while very light in weight are so shaped as to be very rigid and offer a high degree of resistance to bending.

While preferred forms of the invention have been disclosed as embodied in a spring connection in the form of a shackle, it is to be understood that I do not wish to be limited to that form of spring connection nor to the forms shown and that changes may be made within the scope of the invention as defined in the appended claims.

I claim:

1. In a spring shackle, a pair of shackle links each including a pressed metal member having a socket at each end for the reception of anti-friction bearing members, intermediate longitudinally extending marginal flanges integral with said shackle links and with the walls of said sockets, bearing pins to be fixedly secured in a spring and frame, anti-friction bearing members interposed between said pins and said bearing sockets in said shackle links, and means for holding said shackle links together.

2. In a spring shackle, a pair of shackle links each including a channel-shaped pressed metal member having a socket at each end for receiving anti-friction bearing members, bearing pins to be fixedly secured in a spring and frame, anti-friction bearing members interposed between said pins and walls of the socketed ends of said links, and means for securing said links together.

3. In a spring shackle, a pair of shackle links each including a channel-shaped pressed metal member having the free edges of the channels extending toward each other, each link having a socket at each end for receiving anti-friction bearing members, bearing pins to be fixedly secured in a spring and frame, anti-friction bearing members interposed between said pins and the walls of said sockets, a spacer fitting between the sides of the channel-shaped portions of said links and abutting the bottoms of the channels, and a through bolt extending through said spacer and said links for holding the latter together.

4. In a spring shackle, a pair of shackle links each including a channel-shaped pressed metal member having a socket at each end, bearing pins to be fixedly secured in a spring and frame, anti-friction bearing members interposed between said pins and the walls of said end sockets, a dust protector for each of said bearing sockets for excluding dust from the anti-friction bearing members, and means for securing said links together.

5. In a spring shackle, a pair of shackle links each including a pressed metal member having longitudinally extending integral flanges thereon, bearing seats for anti-friction bearing members at opposite ends of said links, means to be secured to a vehicle frame and spring and having bearing seats complementary to the bearing seats on said shackle links, anti-friction bearing members interposed between said seats on said shackle links and said spring and frame, and means for securing said links together.

6. In a spring shackle, a pair of shackle links each including a channel-shaped member having bearing sockets for anti-friction bearing members at opposite ends thereof, the channels and bearing sockets facing toward each other, bearing seat means to be secured to a vehicle frame and spring, anti-friction bearing members interposed between said bearing seat means and said bearing sockets, and means for securing said shackle links together.

7. As an article of manufacture, a shackle link comprising an elongated pressed metal member having longitudinally extending strengthening flanges along each side, said link having an integral cup-shaped socket at each end to receive anti-friction bearing members.

8. As an article of manufacture, a shackle link including a plate having depressed sockets at the ends for receiving anti-friction bearing members, said plate having an offset strengthening flange at each side thereof integrally connected with the walls of said sockets.

9. As an article of manufacture, a shackled link having a channel-shaped intermediate portion, a socket at each end thereof for anti-friction bearing members, the walls of said sockets being integral with the sides of the channeled portion.

10. As an article of manufacture, a shackle link formed of metal having parts struck up to strengthen the same, said link being shaped to form bearing seats adjacent its opposite ends, the metal of said link being of substantially uniform thickness throughout.

11. As an article of manufacture, a shackle link formed of metal, and a metal race ring for anti-friction bearing members secured thereto at opposite ends thereof, the metal of said link being of substantially uniform thickness throughout.

12. As an article of manufacture, a shackle link formed of metal having a cup-shaped depression at one end, and a metal race ring for anti-friction bearing members seated in said depression, the metal of said link being of substantially uniform thickness throughout.

13. A spring shackle link comprising a metal body member and metal race members, the ends of said body member being shaped to engage and hold said race members in place, the metal of said body member being of substantially uniform thickness throughout.

14. A spring shackle link comprising a metal body member and metal race members secured thereto adjacent its opposite ends, the metal of said body member being of substantially uniform thickness throughout.

15. A spring shackle link comprising a metal body member having parts struck up to strengthen the same and metal race members attached to said body member near its opposite ends, the metal of said body member being of substantially uniform thickness throughout.

16. As an article of manufacture, a shackle link including a plate having holding means at the ends thereof, a cup retainer for anti-friction bearing members on said holding means at each end of said link, and an annular dust cap in each said cup retainer.

17. As an article of manufacture, a shackle link including a metal plate having a continuous angularly projecting flange extending entirely around the outer edge thereof, said flange serving to strengthen said plate and to form two anti-friction bearing member receiving means at the ends thereof.

18. As an article of manufacture, a shackle link formed of metal having a bearing cup portion at each end thereof for anti-friction bearing members, said bearing cup portions being imperforate, said link having an aperture therein spaced from said cup portions.

19. As an article of manufacture, a shackle link formed of metal having a bearing portion at each end thereof for anti-friction bearing members, said bearing portions being imperforate, said link having an aperture therein spaced from said bearing portions.

20. In a spring shackle, a pair of shackle links comprising sheet metal plates having integral strengthening portions struck up therefrom, said plates having spaced bearing raceway receiving means thereon and bearing raceways on said receiving means, said plates having openings therein spaced from said receiving means, means extending through said openings for securing said links together, means to be carried by a spring and frame and including antifriction bearing raceways, and antifriction bearing members interposed between the raceways on said shackle links and on said means to be carried by a frame and spring.

21. In a spring shackle, a pair of shackle links comprising sheet metal plates having continuous marginal flanges integral therewith and extending thereabout, parts of said flanges defining parts of seats for receiving raceway means, raceway means on said seats, antifriction bearing members on said raceway means, said plates having openings therein, means extending through said openings for securing said plates together, and raceway means to be carried by a spring and frame and cooperating with said antifriction bearing members.

22. A shackle construction, including two link members formed of metal of substantially uniform thickness throughout, said links having spaced apart sockets therein, anti-friction raceway members in said sockets, antifriction bearing members on said raceway members, means for securing said link members together, and means to be carried by a spring and frame and having anti-friction raceways, said last-mentioned raceways cooperating with said anti-friction bearing members.

23. In a shackle construction, a pair of shackle links formed of metal of substantially uniform thickness throughout and having spaced-apart sockets for anti-friction bearing members, means for securing said shackle links together, anti-friction bearing members in said sockets, and means having raceways for coaction with said anti-friction bearing members and extending into said sockets.

24. In a shackle construction, shackle link means formed of sheet metal and having spaced apart sockets for anti-friction bearing members, anti-friction bearing members in said sockets, and bearing pin means extending between opposed sockets and having raceways for coaction with said anti-friction bearing members.

25. In a shackle construction, shackle link means formed of sheet metal and having spaced apart means for receiving anti-friction bearing members, anti-friction bearing members on said means, means having bearing raceways for coaction with said anti-friction bearing members, and means for excluding foreign matter from and retaining lubricant on said anti-friction bearing members.

26. As an article of manufacture, a shackle link formed of metal having parts struck up to strengthen the same, said link being shaped to form bearing seats at spaced apart points thereon.

27. As an article of manufacture, a shackle link formed of metal of substantially uniform thickness throughout and having spaced apart bearing depressions therein.

28. In a spring connection for connecting a frame part to a spring part, one of said parts carrying means having raceways for anti-friction bearing members, a pair of side plates of sheet metal carried by the other of said parts, said side plates having raceway means complementary to said first mentioned raceways, and anti-friction bearing members between said complementary raceways.

29. In a spring connection for connecting a frame part to a spring part, one of said parts carrying means having raceways for anti-friction bearing members, a pair of side plates of sheet metal pivotally carried by the other of said parts, said side plates having raceway means complementary to said first mentioned raceways, and anti-friction bearing members between said complementary raceways.

30. In a spring connection for connecting a spring part and a frame part, pin means to be carried by one of said parts and having raceways thereon, side plates formed of sheet metal and having depressions therein extending over said pin means, anti-friction bearing members interposed between said raceways and said depressions, and means for supporting said side plates from the other of said parts.

31. In a spring connection, a pair of sheet metal plate members having sockets formed therein for anti-friction bearing members, means having raceways thereon extending into said sockets, anti-friction bearing members interposed between said raceways and said sockets, said plate members having openings therein eccentric to the sockets for receiving means for positioning said plate members.

32. In a spring shackle construction, a pair of sheet metal shackle links having raceways for anti-friction bearing members at spaced points thereon, said links being in part of channel shape, means to be carried by a spring and frame and having raceways complementary to the raceways of said shackle links, anti-friction bearing members interposed between said complementary raceways, spacer means between said links and extending into said parts of channel shape, and means for holding said links to each other and against said spacer means.

WILLIAM CHAS. BETZ.